US008843284B2

(12) United States Patent
Wolterman

(10) Patent No.: US 8,843,284 B2
(45) Date of Patent: Sep. 23, 2014

(54) SYSTEMS AND METHODS FOR CONTROLLING MANUAL TRANSMISSIONS

(75) Inventor: Michael John Wolterman, Brighton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 1440 days.

(21) Appl. No.: 12/541,853

(22) Filed: Aug. 14, 2009

(65) Prior Publication Data
US 2011/0040461 A1 Feb. 17, 2011

(51) Int. Cl.
| G06F 17/00 | (2006.01) |
| B60W 30/19 | (2012.01) |
| F16H 61/28 | (2006.01) |
| B60W 10/11 | (2012.01) |
| B60W 10/02 | (2006.01) |
| F16H 61/02 | (2006.01) |
| F16H 59/02 | (2006.01) |
| F16H 59/08 | (2006.01) |

(52) U.S. Cl.
CPC ........ F16H 61/28 (2013.01); *F16H 2061/0225* (2013.01); *B60W 30/19* (2013.01); *B60W 2510/0638* (2013.01); *B60W 2540/14* (2013.01); *F16H 59/0217* (2013.01); *B60W 2540/16* (2013.01); *B60W 10/11* (2013.01); *B60W 10/02* (2013.01); *F16H 2059/086* (2013.01); *B60W 2510/0657* (2013.01)
USPC ................... 701/51; 701/52; 701/54; 701/58; 701/64; 701/68; 477/111; 477/115; 477/125; 477/131

(58) Field of Classification Search
None
See application file for complete search history.

(56) References Cited

U.S. PATENT DOCUMENTS

| 4,732,246 | A | * | 3/1988 | Tateno et al. .................... 477/78 |
| 4,905,530 | A | | 3/1990 | Stehle et al. |
| 4,912,997 | A | | 4/1990 | Malcolm et al. |
| 5,161,422 | A | | 11/1992 | Suman et al. |
| 5,176,234 | A | * | 1/1993 | Reik et al. ..................... 192/53.2 |
| 5,178,042 | A | | 1/1993 | Moroto et al. |
| 5,249,478 | A | | 10/1993 | Moroto et al. |
| 5,415,056 | A | | 5/1995 | Tabata et al. |
| 5,545,108 | A | * | 8/1996 | Wagner et al. ................ 477/125 |
| 5,722,292 | A | | 3/1998 | Anderson et al. |
| 5,916,292 | A | | 6/1999 | Issa et al. |
| 5,927,150 | A | | 7/1999 | Hirato et al. |

(Continued)

OTHER PUBLICATIONS

U.S. Appl. No. 12/541,878, filed Aug. 14, 2009, Office Action dated Aug. 15, 2012.

*Primary Examiner* — Khoi Tran
*Assistant Examiner* — Jonathan L Sample
(74) *Attorney, Agent, or Firm* — Dinsmore & Shohl LLP

(57) ABSTRACT

A method for controlling a manual transmission of a vehicle includes providing a manual transmission comprising a shift fork actuator and a shifter assembly comprising a shift lever, a shift knob disposed on the shifter lever, a shift lever position sensor and a shifter tactile sensor. The tactile sensor may be used to determine when pressure is applied to the shift knob of the shifter assembly and, when pressure is applied to the shift knob, vehicle operating parameters are monitored. A predicted gear selection is determined based on the monitored vehicle operating parameters. An operator gear selection is then determined based on the shift lever position sensor when the shift lever is moved. The operator gear selection is compared to the predicted gear selection and, when the predicted gear selection is the same as the operator gear selection, the manual transmission is shifted to the predicted gear selection.

21 Claims, 8 Drawing Sheets

(56) References Cited

U.S. PATENT DOCUMENTS

| | | | |
|---|---|---|---|
| 5,993,355 A | 11/1999 | Nordgard | |
| 6,019,009 A * | 2/2000 | Lee | 74/335 |
| 6,145,398 A * | 11/2000 | Bansbach et al. | 74/335 |
| 6,199,003 B1 | 3/2001 | Hollingsworth et al. | |
| 6,253,138 B1 * | 6/2001 | Shober et al. | 701/51 |
| 6,286,381 B1 * | 9/2001 | Reed et al. | 74/336 R |
| 6,295,886 B1 | 10/2001 | Russell | |
| 6,296,327 B1 | 10/2001 | Linkenbach | |
| 6,319,171 B1 * | 11/2001 | Hughes et al. | 477/111 |
| 6,324,928 B1 | 12/2001 | Hughes | |
| 6,358,183 B1 | 3/2002 | Hughes et al. | |
| 6,361,473 B1 | 3/2002 | Mason et al. | |
| 6,364,810 B1 | 4/2002 | Hughes | |
| 6,405,611 B1 | 6/2002 | DeJonge et al. | |
| 6,530,291 B1 * | 3/2003 | Shimoda et al. | 74/336 R |
| 6,564,661 B2 | 5/2003 | DeJonge | |
| 6,659,900 B2 | 12/2003 | Nagasaka et al. | |
| 6,684,143 B2 * | 1/2004 | Graf et al. | 701/51 |
| 6,692,406 B2 * | 2/2004 | Beaty | 477/32 |
| 6,732,847 B1 | 5/2004 | Wang | |
| 6,773,369 B2 | 8/2004 | Altenkirch et al. | |
| 6,835,165 B2 | 12/2004 | Kim | |
| 6,892,599 B2 | 5/2005 | Bjorkard | |
| 6,948,398 B2 | 9/2005 | Dybro | |
| 6,979,279 B2 | 12/2005 | Hughes et al. | |
| 6,984,002 B2 * | 1/2006 | Hashida et al. | 303/114.1 |
| 7,001,308 B2 | 2/2006 | Henneken et al. | |
| 7,062,986 B2 * | 6/2006 | Metzger et al. | 74/335 |
| 7,104,152 B2 | 9/2006 | Levin et al. | |
| 7,107,868 B2 | 9/2006 | Yone | |
| 7,200,477 B2 * | 4/2007 | Burzio | 701/52 |
| 7,210,370 B2 | 5/2007 | Giefer et | |
| 7,222,551 B2 | 5/2007 | Kayano et al. | |
| 7,258,649 B2 | 8/2007 | Matsunaga et al. | |
| 7,328,781 B2 | 2/2008 | Song | |
| 7,350,432 B2 | 4/2008 | Somschor et al. | |
| 7,421,923 B2 | 9/2008 | Kim | |
| 7,565,850 B2 | 7/2009 | Reik et al. | |
| 7,584,681 B2 | 9/2009 | Kozaki et al. | |
| 7,591,203 B2 * | 9/2009 | Ochi et al. | 74/331 |
| 7,650,810 B2 | 1/2010 | Levin et al. | |
| 7,703,801 B2 | 4/2010 | Levine | |
| 7,832,535 B2 * | 11/2010 | Kummer et al. | 192/13 R |
| 8,155,849 B2 * | 4/2012 | Porzel et al. | 701/68 |
| 8,167,383 B2 * | 5/2012 | Nishino et al. | 303/122.05 |
| 8,322,247 B2 * | 12/2012 | Wolterman | 74/473.3 |
| 8,348,352 B2 * | 1/2013 | Nishino et al. | 303/122.05 |
| 8,393,240 B2 * | 3/2013 | Wolterman | 74/473.16 |
| 2001/0025536 A1 * | 10/2001 | Nishimura | 74/335 |
| 2002/0142885 A1 * | 10/2002 | Graf et al. | 477/115 |
| 2003/0060328 A1 * | 3/2003 | Beaty | 477/109 |
| 2003/0172757 A1 * | 9/2003 | Yone | 74/335 |
| 2003/0188594 A1 | 10/2003 | Levin et al. | |
| 2004/0166992 A1 * | 8/2004 | Buchanan et al. | 477/181 |
| 2004/0216549 A1 * | 11/2004 | Shiomi et al. | 74/473.12 |
| 2004/0255771 A1 * | 12/2004 | Tsubouchi et al. | 91/376 R |
| 2005/0028633 A1 | 2/2005 | Giefer et al. | |
| 2005/0223836 A1 * | 10/2005 | Gibson | 74/478 |
| 2006/0213738 A1 | 9/2006 | Moser et al. | |
| 2007/0126282 A1 * | 6/2007 | Hwang | 303/10 |
| 2007/0204718 A1 * | 9/2007 | Strait et al. | 74/523 |

* cited by examiner

SYSTEMS AND METHODS FOR CONTROLLING MANUAL TRANSMISSIONS

CROSS REFERENCE TO RELATED APPLICATIONS

The present application is related to U.S. patent application Ser. No. 12/541,870 filed Aug. 14, 2009 and entitled "SHIFTER ASSEMBLIES FOR ELECTRONICALLY SHIFTED MANUAL TRANSMISSIONS" and U.S. patent application Ser. No. 12/541,878 filed Aug. 14, 2009 and entitled "INSTRUMENTED CONTROL PEDALS FOR ELECTRONICALLY SHIFTED MANUAL TRANSMISSIONS".

TECHNICAL FIELD

The present invention generally relates to systems and components for controlling a manual transmission of a vehicle and, more specifically, to systems and components for electronically shifting a manual transmission.

BACKGROUND

As background, there are a number of advantages of using a manually-shifted transmission over an automatic transmission in vehicles. First, manual transmissions cost less to manufacture than comparable automatic transmissions. Second, manual transmissions weigh less than automatic transmissions, thus improving fuel economy and handling. Finally, even in the absence of any weight advantage, manual transmissions generally have better fuel economy than automatic transmissions.

Conventional manual transmissions also have some drawbacks. For example, during the assembly of a vehicle with a manual transmission, the mechanical linkage between the shifter and the shift forks may require adjustment in order to compensate for component and/or manufacturing variations. In addition, the mechanical linkage between the clutch pedal and the clutch may also require adjustment for the same reason. These adjustments ensure that both the shifter and the clutch pedal will operate properly when the vehicle is subsequently delivered to the customer. The adjustments to the mechanical linkages during manufacturing may be costly in terms of both labor and the time required to make the adjustment.

Accordingly, a need exists for alternative manual transmission systems which may be electronically shifted without mechanical linkages between the shifter and the shift forks as well as between the clutch pedal and the clutch.

SUMMARY

In one embodiment, a method for controlling a manual transmission of a vehicle includes providing a manual transmission comprising a shift fork actuator and a shifter assembly comprising a shift lever, a shift knob disposed on the shift lever, a shift lever position sensor and a shifter tactile sensor. The shifter tactile sensor may be used to determine when pressure is applied to the shift knob of the shifter assembly and, when pressure is applied to the shift knob, vehicle operating parameters are monitored. A predicted gear selection is determined based on the monitored vehicle operating parameters. An operator gear selection is then determined based on the shift lever position sensor when the shift lever is moved. The operator gear selection is compared to the predicted gear selection and, when the predicted gear selection is the same as the operator gear selection, the manual transmission is shifted to the predicted gear selection.

In another embodiment, a system for controlling a manual transmission of a vehicle may include a shifter assembly, a shift fork actuator, a clutch actuator, and a controller. The shifter assembly may include a shift lever, a shift knob disposed on the shift lever, a shift gate, a shifter tactile sensor and a shift lever position sensor. The shifter tactile sensor may be operable to detect a pressure applied to the shift knob and send a tactile signal to the controller indicative of the pressure being applied to the shift knob. The shift lever position sensor may be operable to detect a position of the shift lever in the shift gate and send a gear selection signal to the controller indicative of a selected gear ratio. The controller may be operable to determine a shift command signal based on the received gear selection signal when the received tactile signal indicates pressure is applied to the shift knob. The controller may also be operable to send a clutch command signal to the clutch actuator and send a shift command signal to the shift actuator when the gear selection signal indicates that the shift lever has moved. The clutch actuator may be operable to receive the clutch command signal from the controller and, based on the received clutch command, actuate the clutch while the shift fork actuator is operable to receive the shift command signal from the controller and shift the manual transmission to the gear ratio represented by the shift command signal.

In another embodiment, a method for controlling a manual transmission of a vehicle includes providing a manual transmission including a shift fork actuator and a clutch actuator. The manual transmission may also comprise a controller operable to actuate the shift fork actuator and the clutch actuator and receive at least one vehicle operation input signal. A driving style of an operator of the vehicle is learned by storing a plurality of shift histories in a memory associated with the controller. The shift histories may include the value of at least one vehicle operation input signal for a shift event. A predicted gear selection is determined based on at least one current vehicle operation input signal, a presently selected gear ratio and the stored shift histories. The shift fork actuator and the clutch actuator may be actuated to shift the manual transmission to the predicted gear selection.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 2:
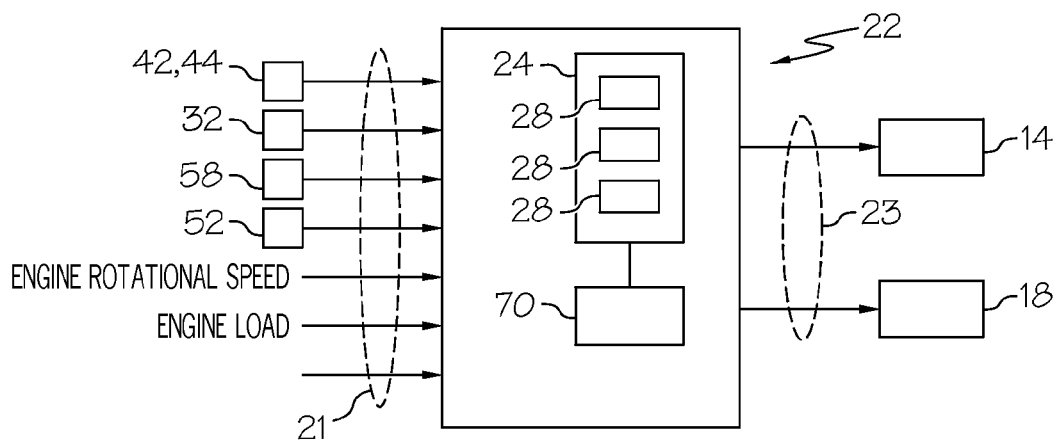
FIG. 2 schematically depicts a controller for a manual transmission according to one or more embodiments shown and described herein.

FIG. 2 generally depicts an embodiment of a system for electronically shifting a manual transmission. The system may generally comprise a controller coupled to a shift lever position sensor, a shifter tactile sensor, a clutch pedal position sensor, a clutch pedal pressure sensor, a shift fork actuator and a clutch actuator. The controller may be operable to shift the manual transmission using the shift fork actuator and clutch actuator based on signals received from the various sensors coupled to the controller and other inputs received from various vehicle systems. The components of the system as well as the operation of the system will be discussed in more detail herein.

While FIG. 2 generally shows the interconnectivity of various components of the system for electronically shifting a manual transmission with arrows, it should be understood that the arrows are also indicative of signals which are passed between the various components of the system. Further, it should be understood that the phrase "sensor signal," as used herein, is defined as any electrical, electronic, or wireless signal that is sent by any sensor or device to the controller, including but not limited to the gear selection sensor signal, the tactile sensor signal, the clutch pedal position sensor signal, the clutch pedal pressure sensor signal, the engine rotational speed signal, the engine load signal, the vehicle speed signal, the brake pedal position signal, and the throttle position signal. The phrase "command signal," as used herein, is defined as any electrical, electronic, or wireless signal that is sent by the controller to an actuator, including but not limited to the shift fork actuator and the clutch actuator. Further, it should be understood that the term "gear" may be used interchangeably with "gear ratio"; for example, "1st gear" is the equivalent of "the first gear ratio." In addition, the term "shift" is defined as changing from one gear ratio to another gear ratio; thus, when the operator shifts gears from 1st gear to 2nd gear, this is the equivalent of the operator directing the control system of the manual transmission to move from the first gear ratio to the second gear ratio. Furthermore, the phrase "gear shift" also refers to the act of moving the manual transmission from one gear ratio to another gear ratio.

Figure 1:
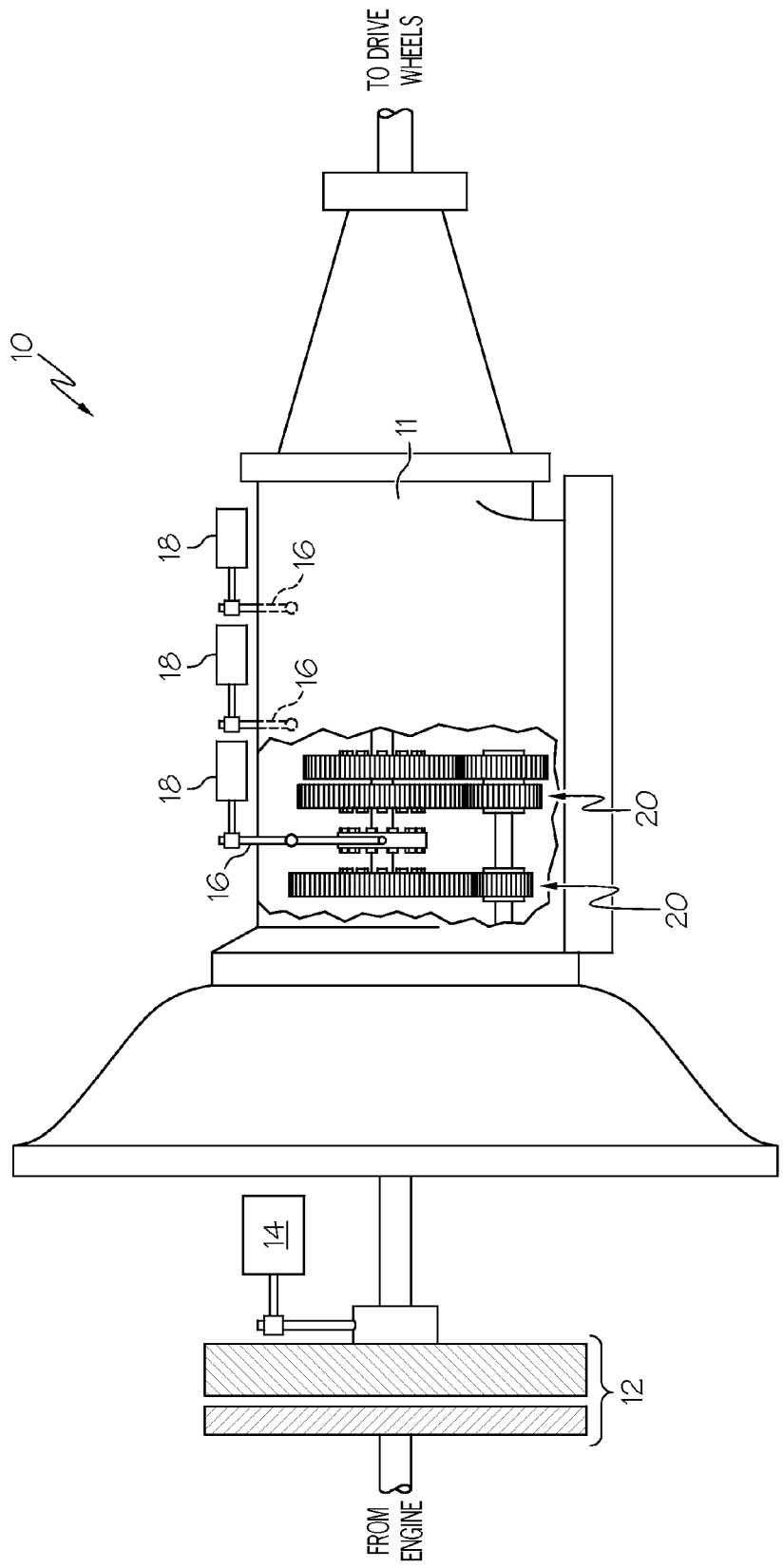
FIG. 1 depicts a simplified view of a manual transmission according to one or more embodiments shown and described herein.

Referring to FIG. 1, a manual transmission 10 for a vehicle may comprise a clutch 12, shift forks 16, and a plurality of gear ratios 20 disposed in a transmission housing 11. The manual transmission 10 may be positioned between the engine and the drive wheels and may allow the operator to control the movement of the vehicle by permitting the operator to select an appropriate gear ratio for a given speed and load of the vehicle. The clutch 12 allows the output shaft of the engine to be disengaged from the manual transmission while the operator is changing gears or while the vehicle is stopped. The disengagement of the clutch 12 during gear changes may be necessary to allow the selected gear ratio to be properly synchronized to the drive wheels, thus permitting smooth operation of the transmission.

In one embodiment, as shown in FIG. 1, the clutch 12 may be a "dry clutch," which may comprise two discs. One of the discs may be mechanically coupled to the output shaft of the engine, while the other disc may be mechanically coupled to the plurality of gear ratios 20. When the clutch 12 is engaged, the two discs may be forced together by a spring or other bias means such that the two discs become mechanically coupled to one another due to the friction between them. Conversely, when the clutch 12 is disengaged, the two discs are separated such that there is no mechanical coupling between them. While the clutch 12 is described as a "dry clutch," it is contemplated that other types of clutches may be used in conjunction with the system for automatically shifting a manual transmission described herein, including, without limitation, dual clutches and the like. Further, it is also contemplated that the clutch 12 may be partially engaged or disengaged, such that the two discs are in contact but rotating at different speeds.

The shift forks 16 may be selectively coupled to the gear ratios disposed in the transmission housing 11 such that an operator of the vehicle may select a gear ratio for the manual transmission 10. In one embodiment, the shift forks 16 may be used to select one of five forward gear ratios or a reverse gear ratio. Other embodiments may have more or less forward gear ratios. Furthermore, although the embodiment described herein only depicts three shift forks 16, it should be understood that any number of shift forks (including one) are contemplated. As an illustrative example, a manual transmission with three forward gear ratios and one reverse gear ratio may comprise only two shift forks. It should also be understood that other types and configurations of shift forks and mechanisms for shifting gears may be used in conjunction with the system for electronically shifting a manual transmission described herein.

The plurality of gear ratios 20 permits an operator of the vehicle to select an appropriate gear ratio for a given speed and load of the vehicle. As previously discussed, in one embodiment there may be five or more forward gear ratios and one reverse gear ratio. A low gear ratio (for example, 1st gear) may allow a high engine speed relative to the speed of the vehicle, thus permitting the operator to begin moving the vehicle from a complete stop or climbing a steep hill. Higher gear ratios may result in a lower engine speed relative to the speed of the vehicle. The reverse gear ratio permits the operator to move the vehicle in the reverse direction.

Referring now to FIGS. 1-4, the system for controlling a manual transmission of a vehicle comprises a shifter assembly 30, at least one shift fork actuator 18 mechanically coupled to the to the shift forks 16, an instrumented control pedal 50, (such as an instrumented clutch pedal), a clutch actuator 14 mechanically coupled to the clutch 12, and a controller 22.

Figure 3A:
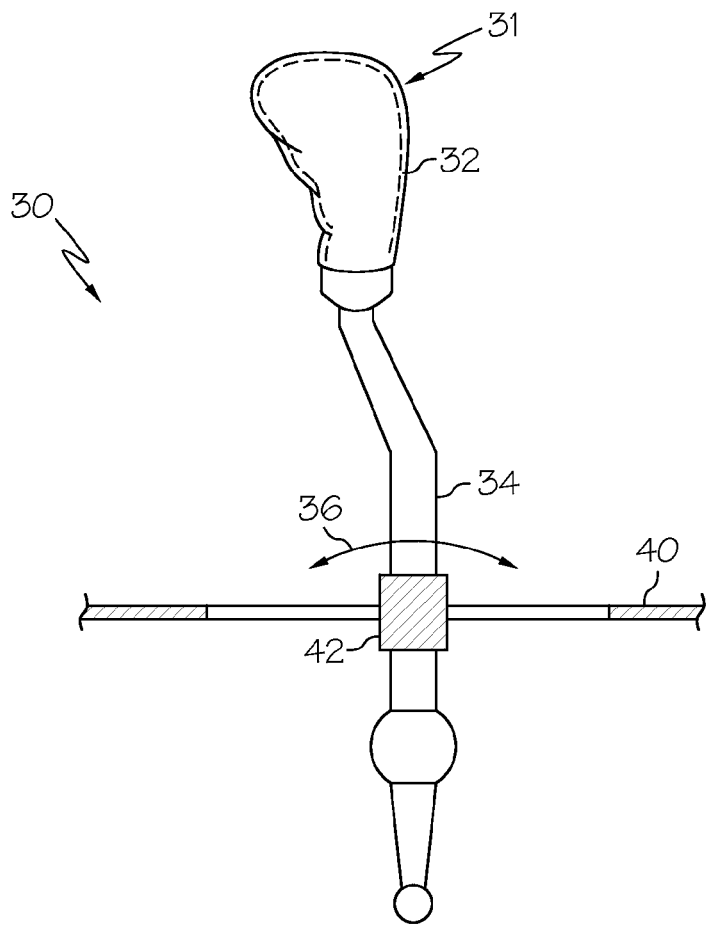
FIGS. 3A-3C depict a shifter assembly comprising a shift lever, a shift knob, a shift guide, and a shifter tactile sensor according to one or more embodiments shown and described herein.
Figure 3B:
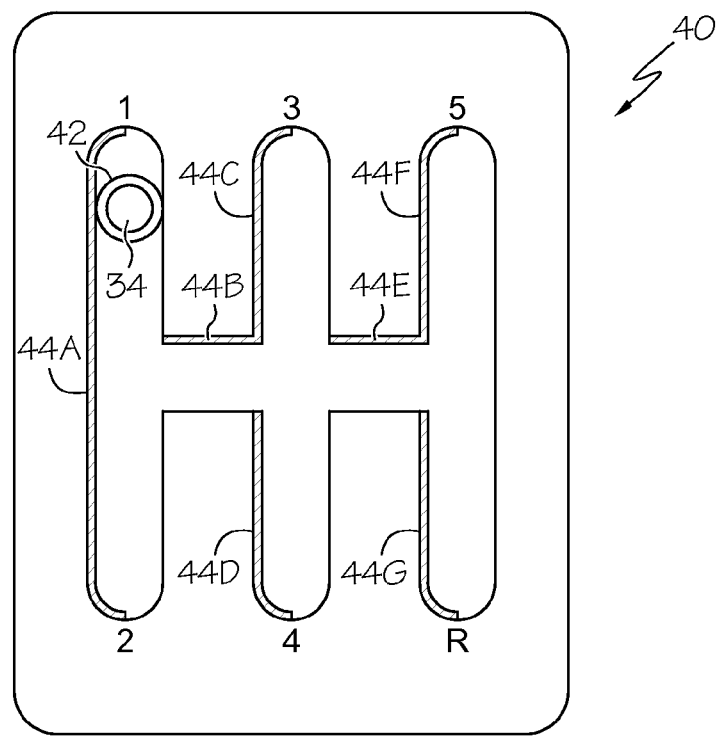
Figure 3C:
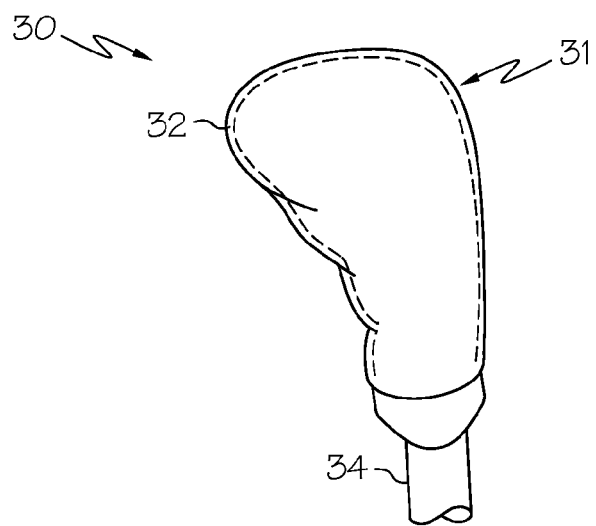

As depicted in FIGS. 3A-3C, the shifter assembly 30 may comprises a shift lever 34, a gear selection sensor, a tactile sensor 32 and a guide 40. The shift lever 34 may be disposed in the guide 40 such that the operator may move the shift lever 34 in a particular pattern, such as the double "H" pattern depicted in FIG. 3B, or another pattern suitable for shifting the gears of the vehicle. The guide 40 may generally define a specific position for the shift lever such that, when the shift lever is located in that position, a specific gear ratio is selected. As an illustrative example, the guide 40 may have a specific position for each of the gear ratios of the transmission. In the embodiment shown, the guide 40 comprises six positions: one for each of the five forward gears (labeled "1,"

"2," "3," "4," and "5") and the reverse gear ratio (labeled "R"). The operator may move the shift lever 34 to one of these specific positions in order to select that particular gear ratio. If the shift lever is moved to the center of the "H" pattern, no gear ratio is selected (i.e., the transmission is placed in "neutral"). In other embodiments, the guide 40 may assume other geometries or configurations with the same or similar functionality.

As noted herein, the shifter assembly 30 may comprise a gear selection sensor which may be disposed in the guide 40 and used to determine the position of the shift lever 34 relative to the guide 40 and, therefore, the gear ratio selected by an operator of the vehicle. The gear selection sensor may comprise linear position sensors, such as magnetostrictive sensors, LVDTs and the like, inductive displacement sensors, optical sensors and/or any sensor(s) operable to determine the relative displacement of two objects.

In one embodiment, the gear selection sensor may be a resistive sensor comprising a ring 42 and a plurality of sensing strips 44A-44G, as depicted in FIG. 3C. In this embodiment, the ring 42 may be disposed on the shift lever 34 while the sensing strips 44A-44G may be disposed at various locations along the guide 40. As the ring 42 is moved through the guide 40, the ring may be in electrical communication with the sensing strips 44A-44G on the shift lever guide 40 such that the gear selection sensor produces a voltage output which is dependent on the position of the shift lever 34 in the guide 40. More specifically, as the shift lever 34 is moved in the guide 40, the ring 42 is in electrical communication with the sensing strips 44A-44G at different locations, thereby producing a different output voltage level depending on the location of the shift lever 34 in the guide 40. For example, when the shift lever 34 is placed near the 1st gear position, the gear selection sensor may output approximately 1 volt. When the shift lever 34 is moved to the $2^{nd}$ gear position, the output of the gear selection sensor may increase from about 1 volt to about 2 volts. Similarly, when the shifter is moved from $2^{nd}$ gear to third gear, the output of sensor strip 44B may increase from 2 volts to 3 volts while the output of sensor strip 44C may increase from 3 volts to 3.5 volts. Table 1, shown below, contains examples of the output of the gear selection sensor as the shift lever traverses along the various sensor strips disposed in the guide 40. Accordingly, by monitoring the output of the gear selection sensor, the position of the shift lever 34 in the shift guide 40 may be determined. Further, by monitoring the change in the output of the gear selection sensor over time, the direction of motion of the shift lever 34 in the guide 40 may also be determined as well as the speed at which the shift lever 34 traverses through the guide 40. The controller 22 may use the output signal from the gear selection sensor in conjunction with an AI algorithm in order to determine the driving style of the operator of the vehicle.

TABLE 1

Gear Selection Sensor Output

| Sensor Strip ID | Change in Gear Selection Sensor Output (volts) | Gear shift |
| --- | --- | --- |
| 44A | 1 V to 2 V | $1^{st}$ to $2^{nd}$/$2^{nd}$ to $1^{st}$ |
| 44B | 2 V to 3 V | $2^{nd}$ to $3^{rd}$/$3^{rd}$ to $2^{nd}$ |
| 44C | 3 V to 3.5 V | $2^{nd}$ to $3^{rd}$/$3^{rd}$ to $4^{th}$ |
| 44D | 3.5 V to 4 V | $3^{rd}$ to $4^{th}$/$4^{th}$ to $5^{th}$ |
| 44E | 4 V to 5 V | $4^{th}$ to $5^{th}$/$5^{th}$ to $4^{th}$ |
| 44F | 5 V to 5.5 V | $4^{th}$ to $5^{th}$/$5^{th}$ to $4^{th}$ |
| 44G | 5.5 V to 5.6 V | in to reverse |

While FIGS. 3A and 3B depict the gear selection sensor as comprising a ring used in conjunction with a plurality of sensing strips, it should be understood that any suitable sensor or combination of sensors may be used to determine the position of the shift lever relative to the guide.

Referring now to FIGS. 3A and 3C, the shifter assembly 30 may also comprise a shifter tactile sensor 32 operable to determine when pressure is applied to the shifter assembly 30, such as when an operator of the vehicle contacts the shift knob 31 in preparing to make a shift. In the embodiments shown in FIGS. 3A and 3C, the shifter tactile sensor 32 is disposed on the shift knob 31. The shifter tactile sensor may be operable to determine when pressure is applied to the shift knob 31 by outputting a signal to the controller 22 when pressure is applied to the shift knob 31. The output signal may be generally indicative of pressure applied to the shift knob 31, such as a binary signal (e.g., one value, such as +1 volts may be indicative of an applied pressure while a second value, such as 0 volts may be indicative of no pressure being applied to the shift knob 31). Alternatively, the output signal may be proportional to the amount of pressure applied to the shift knob 31.

In the embodiment shown in FIGS. 3A and 3C, the shifter tactile sensor 32 may be a flexible web or matrix of sensors which are disposed over the shift knob 31, which, in turn, is disposed on the shift lever 34. For example, the shifter tactile sensor 32 may be a Pressure Management System flexible tactile sensor manufactured by Tekscan, Inc. or a similar flexible web or matrix of pressure sensors. In one embodiment, the shifter tactile sensor 32 is disposed between the shift knob 31 and a flexible covering (not shown) which covers the shift knob. In another embodiment, the shifter tactile sensor 32 may be disposed directly on the surface of the shift knob 31 such as when the shifter tactile sensor 32 is formed with the shift knob 31 or otherwise attached to the surface of the shift knob 31. Alternatively or additionally, the tactile sensor(s) may be disposed on the shift lever 34 such as in embodiments (not shown) where the shift lever does not comprise a separate shift knob.

As noted herein, the shifter tactile sensor 32 may be operable to detect the pressure of the operator's hand on the shift knob 31. In one embodiment, the output signal from the shifter tactile sensor (e.g., the tactile signal) is indicative of a pressure applied to the shift knob, as described herein. In another embodiment, the shifter tactile sensor 32 may be able to discern the amount of pressure exerted by the operator's hand and output a signal proportional to the applied pressure, as described herein. The shifter tactile sensor 32 may be operable to send the tactile signal to the controller 22.

While embodiments shown and described herein depict the shifter tactile sensor 32 as being located on the shift lever 34, specifically the shift knob 31 of the shift lever 34, it should be understood that the shifter tactile sensor 32 may be positioned in other locations on the shift lever 34 to effectuate sensing a pressure applied to the shift lever. For example, in an alternative embodiment (not shown) the shifter tactile sensor may be disposed at the base of the shift lever such that any force or pressure applied to the top of the shift lever is communicated along the shift lever to the shifter tactile sensor.

Referring again to FIGS. 1 and 2, the system for electronically shifting a manual transmission may also comprise one or more shift fork actuators 18 which are operatively coupled to the controller 22. The shift fork actuators 18 may be actuated by the controller 22. More specifically, the shift fork actuators may be operable to receive a shift command from the controller 22 and, based on the received shift command, shift the manual transmission 10 to the desired gear ratio indicated by the shift command by causing the shift fork to move in a specified direction and thereby engage or disengage a specific gear ratio. The shift fork actuator may comprise electromechanical actuators, hydraulic actuators, or any other suitable actuator or mechanism now known or subsequently developed. In the embodiment described herein, the shift fork actuators 18 comprise electromechanical actuators, such as solenoids or servo motors, which are operable to receive a shift command signal from the controller 22. The shift fork actuators 18 may be operable to place the shift forks in a plurality of positions, each position corresponding to a specific gear ratio. As an illustrative example, the shift fork actuator 18 may be operable to place the shift forks in one of six possible configurations, one for each of the five forward gears and one for the reverse gear. Furthermore, it is contemplated that one or more shift fork actuators may be used, depending on the design of the manual transmission and the number of gear ratios contained therein. For transmissions with multiple shift forks and shift fork actuators, the controller 22 may send a unique shift command to each shift fork actuator in order to properly select the desired gear ratio.

Figure 4:
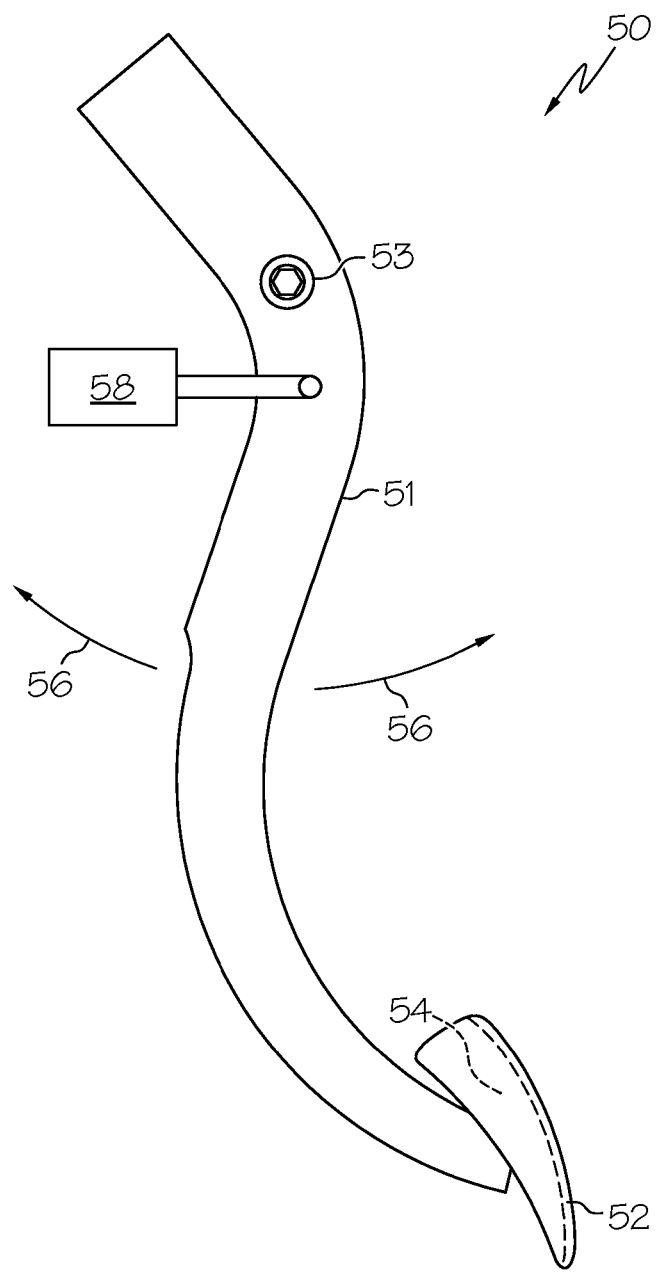
FIG. 4 depicts a control pedal for a vehicle according to one or more embodiments shown and described herein.

Referring now to FIG. 4, the system for electronically shifting a manual transmission of a vehicle may further comprise one or more instrumented control pedals 50 which allow an operator to control one or more aspects of the operation of the vehicle and provide one or more inputs to the controller 22. For example, the control pedal 50 may comprise a clutch pedal which may be used by the operator to actuate the clutch thereby disengaging or engaging the engine of the vehicle with the transmission of the vehicle. Similarly, the control pedal 50 may comprise a brake pedal which may be used by the operator to actuate the brakes of the vehicle.

Generally, the control pedal 50 may comprise a lever portion 51 extending between a first end and a second end. A pedal portion 54 may be disposed at the first end of the lever portion 51 while a pivot 53 is disposed proximate the second end of the lever portion 51. The pivot 53 permits the control pedal 50 to be pivotally attached to a mounting structure (not shown) of the vehicle (not shown) such that, when an operator of the vehicle applies pressure to the pedal portion 54 (e.g., when an operator depresses the control pedal 50 by stepping on the pedal portion 54), the control pedal 50 rotates about the pivot 53 as generally indicated by arrows 56.

The pedal portion 54 may comprise a pedal pressure sensor 52 disposed on the pedal portion 54. The pedal pressure sensor 52 may comprise a pressure sensor, such as, for example, a piezo-electric pressure transducer or similar sensor, such as a mechanical limit switch or the like, which is operable to output a signal indicative of an applied pressure. In one embodiment, the pedal pressure sensor 52 may comprise a web or matrix of pressure sensors, such, as for example, a Pressure Management System flexible tactile sensor manufactured by Tekscan, Inc. or a similar flexible web or matrix of pressure sensors. In one embodiment, the pedal pressure sensor 52 may be disposed directly on the surface of the pedal portion 54. In this embodiment, a pedal pad (not shown), such as rubber cover or the like, may also be disposed over the surface of the pedal portion 54 such that the pedal pressure sensor 52 is disposed between the pedal portion and the pedal pad. In another embodiment, when the pedal portion 54 comprises a pedal pad, the pedal pressure sensor may be disposed on the surface of the pedal pad.

The output signal of the pedal pressure sensor 52 may be generally indicative of pressure applied to the pedal portion 54. For example, in one embodiment, the output signal of the pedal pressure sensor 52 may comprise a binary signal (e.g., one value, such as a +1 volts, may be indicative of an applied pressure while a second value, such as 0 volts, may be indicative of no pressure being applied to the pedal pressure sensor 52). Alternatively, the output signal may be proportional to the amount of pressure applied to pedal pressure sensor.

In one embodiment, the pedal pressure sensor 52 may be operable to detect when an operator of the vehicle positions his or her foot on the pedal portion 54 of the control pedal 50 but does not depress the pedal portion 54. The pedal pressure sensor 52 may be operatively coupled to a control unit (not shown), such as controller 22 shown in FIG. 2, and operable to send a pedal pressure signal to the controller indicative of the operator's foot being positioned on the pedal portion 54.

In the embodiments shown and described herein, the control pedal 50 may further comprise a pedal position sensor 58. The pedal position sensor 58 may be operable to detect the position of the control pedal 50 and send a pedal position signal to a controller (not shown), such as the controller 22. The pedal position signal may be indicative of the position of the control pedal 50 as the control pedal is rotated about the pivot 53. More specifically, the pedal position signal may be indicative of the amount or degree by which the control pedal 50 is depressed.

In the embodiment depicted in FIG. 4, the pedal position sensor 58 may be a linear position sensor, such as an LVDT or magnetostrictive linear position sensor, which is coupled to the lever portion 51 of the control pedal 50. As the control pedal 50 is rotated about the pivot 53 as indicated by arrows 56, the output of the pedal position sensor 58 may change based on the displacement of the lever portion 51 relative to the pedal position sensor 58. For example, the output signal (e.g., the pedal position signal) of the pedal position sensor 58 may be approximately zero volts when completely released, and approximately 5 volts when completely depressed. When the control pedal is in an intermediate position (e.g., not completely released or completely depressed), the pedal position signal may have an intermediate value which may be calibrated to a corresponding position of the control pedal 50.

While the embodiments described herein refer to the pedal position sensor 58 as being a linear position sensor, it should be understood that various other sensors may be used to determine the position of the control pedal 50. For example, the pedal position sensor may comprise a shaft encoder or a similar non-contact rotary position sensor disposed relative to the pivot 53. Further, the pedal position sensor 58 may be mounted at the pivot point of the control pedal 50, or it may be mounted in some other appropriate location suitable for measuring the displacement of the control pedal.

In one embodiment, a controller operatively coupled to the pedal position sensor 58, such as controller 22, may be able to calculate the speed at which the control pedal 50 is being moved by the operator by observing the rate of change of the control pedal position signal over a given time period. The controller 22 may use this information in its AI algorithm in order to determine the driving style of the operator of the vehicle as will be discussed in more detail herein.

In one embodiment, the control pedal 50 is a clutch pedal of the vehicle and the pedal position signal output from the pedal position sensor 58 is indicative of the amount that the clutch pedal has been depressed by the operator while the pedal pressure signal output from the pedal pressure sensor 52 is indicative of the operator placing his or her foot on the clutch pedal. The clutch pedal pressure signal is passed to the controller 22 which utilizes the signal to anticipate the occurrence of a shift. The clutch pedal position signal is passed to the controller 22 which, based on the clutch pedal position signal, sends a control signal to the clutch actuator 14 thereby actuating the clutch 12. Depending on the signal received from the clutch pedal position sensor 58, the clutch 12 may fully or partially disengage the transmission from the engine.

In another embodiment, the control pedal 50 is a brake pedal of the vehicle and the pedal position signal output from the pedal position sensor 58 is indicative of the amount that the brake pedal has been depressed which, in turn, corresponds to the braking effort intended by an operator of the vehicle. The pedal pressure signal output from the pedal pressure sensor 52 is indicative of the operator placing his or her foot on the brake pedal. The brake pedal pressure signal is passed to the controller 22 which utilizes the signal to anticipate the occurrence and direction (e.g., up shift or down shift) of a shift. The brake pedal position signal may be passed to the controller 22 which, based on the brake pedal position signal, sends a control signal to a brake actuator thereby actuating the brakes of the vehicle. The brake pedal position signal may also be utilized to predict or anticipate the occurrence and direction of a shift.

Referring again to FIGS. 1 and 2, the system for electronically shifting a manual transmission may further comprise a clutch actuator 14 mechanically coupled to the clutch 12 and electrically coupled to the controller 22. The clutch actuator may receive a clutch command signal from the controller 22 and, based on the received clutch command signal, engage or disengage the clutch 12. The clutch actuator 14 may be one of a variety of actuators, including but not limited to a hydraulic actuator, an electromechanical actuator (e.g., a solenoid), or other type of suitable actuator. In the embodiment described herein, the clutch actuator 14 may comprise an electromechanical device such that the application of an electrical current to the actuator produces a force sufficient to engage or disengage the clutch 12. Furthermore, the clutch actuator 14 may by operable to partially engage the clutch. Thus, it is contemplated that the clutch actuator 14 may operate to allow more than just complete engagement or complete disengagement of the clutch. In order to mimic the operation of a conventional manual transmission, the clutch actuator 14 may permit multiple levels of engagement based on the displacement of the clutch pedal as determined by the pedal position sensor 58, thus facilitating smooth operation of the manual transmission.

Referring now to FIG. 2, the controller 22 may comprise a memory 24 which stores an artificial intelligence ("AI") algorithm 70 that facilitates operation of the electronically shifted manual transmission. The controller 22 may be in electrical communication with the various sensors and actuators as described herein. For example, in one embodiment, the controller 22 may be electrically coupled to the gear selection sensor, the tactile sensor, the clutch pedal position sensor, and the clutch pedal pressure sensor, such that the controller is operable to send and/or receive electric and/or RF signals to and/or from each of these components. In another embodiment, controller 22 may additionally receive vehicle operation input signals 21 from various other systems and components of the vehicle. For example, the controller 22 may receive vehicle operation input signals such as a rotational speed signal indicative of the rotational speed of the engine, an engine load signal indicative of the load on the engine, a vehicle speed signal indicative of the speed of the vehicle, a brake pedal position signal representing the position of the brake pedal, a throttle position signal indicative of the position of the engine throttle and a steering wheel position sensor indicative of the angular orientation of the steering system. The various electrical signals transmitted and received by the controller may assume a number of different forms. As an illustrative embodiment, a signal may be an analog voltage signal which ranges from zero to 5 volts. Alternatively, a signal may be an analog current signal which ranges from zero to 20 milliamps. In yet another embodiment, a signal may be digital, such as CAN Bus or similar digital signal. In yet another embodiment, some or all of the signals may be communicated to the controller 22 through wireless technology, such as electromagnetic radio waves.

The signal representing the rotational speed of the engine may indicate a number of engine revolutions per minute (RPM). For example, this signal may indicate that the engine is rotating at 2000 RPM. Generally, the rotational speed of the engine is controlled by the operator via the throttle, or accelerator pedal. However, other factors may influence the rotational speed of the engine, including but not limited to the load on the engine and whether the clutch is engaged or disengaged. The signal representing the load of the engine may indicate the power being supplied by the engine to the wheels of the vehicle and may be expressed as a percentage of the maximum power of the engine.

The vehicle speed signal indicates the speed of the vehicle and is usually expressed in miles per hour ("MPH"). The vehicle speed signal and, specifically, a change in the vehicle speed signal may be indicative of the operator's desire to increase or decrease the speed of the vehicle and, therefore, may be indicative of a possible up-shift of down shift. The signal indicative of the position of brake pedal may indicate whether and to what degree the operator may be applying the brakes of the vehicle. This brake pedal position signal may correspond to a range of brake actuation from 0% (brakes not being applied) to 100% (brakes fully applied). The brake pedal position signal may also be generally indicative of a possible up-shift or down shift. For example, if the brake is depressed, the operator may wish to down shift the vehicle to further slow the vehicle.

The signal representing the position of the engine throttle indicates the relative position of the throttle or accelerator pedal and, as with the vehicle speed signal, generally indicates the operator's desire to increase or decrease the speed of the vehicle. Accordingly, the position of the engine throttle may also be used to anticipate and/or determine a direction (e.g., an up shift, or down shift) of a shift.

The signal representing the position of the steering system may also be indicative of a pending up shift or down shift. As an illustrative example, during a gear shift the AI algorithm may observe that the steering system is turned at a very sharp angle (e.g., indicating a sharp turn of the vehicle) and may predict, in conjunction with other inputs to the controller, that the operator is going to downshift because it is likely that he is making a turn and is slowing down.

As described herein, the shift fork and/or clutch actuators may also be in operable communication with the controller 22, which may be operable to send a shift command signal to the shift fork actuators 18 and a clutch command signal to the clutch actuator 14 and thereby actuate the shift fork actuators and/or the clutch actuators. The shift and clutch command signals may assume a variety of forms. As an illustrative embodiment, the commands may be pulse-width modulated signals which, when sent to the actuator, cause the shift fork actuator to move to the desired gear ratio, or the clutch actuator to engage or disengage the clutch. In still another embodiment, the shift and clutch commands may be digital, such as CAN Bus, in which the actuator itself may have electronics operable to receive the digital signal and move the actuator to the appropriate position. As an illustrative example, an actuator comprising a solenoid may have associated electronics capable of receiving the CAN Bus signal from the controller 22 and converting the signal into the proper voltage and current levels required to operate the solenoid. However, it should be understood that many alternative types of command signals may be possible.

It should be understood that the controller 22 may be capable of assuming a number of different configurations. In one embodiment, the controller 22 may be a microprocessor-based system comprising a microprocessor and a program. The program may include an AI algorithm 70 as well as other programs or subroutines which may facilitate the operation of the controller 22 and, in turn, the transmission of the vehicle. The program may comprise a series of computer executable instructions which can be read and executed by the microprocessor. It should be understood that various types of controllers may be used in order to achieve the same result. For example, the controller may comprise a programmable logic controller (PLC), a general purpose computer, or discrete logic chips. Furthermore, the circuitry comprising the controller 22 may be located in one place or may be distributed in various locations within the vehicle.

The memory 24 of the controller 22 is operable to store information regarding the status of the input signals when gears are shifted. This information may be stored in a shift history 28 and may include any of the following input and output signals, either alone or in combination: the gear selection signal, the tactile signal, the clutch pedal position signal, the clutch pedal pressure signal, the rotational speed of the engine, the load on the engine, the speed of the vehicle, the position of brake pedal, the position of the throttle, the previous gear selection, and the present gear selection. In one embodiment, the shift history may also include the speed at which the clutch pedal was depressed and/or the speed at which the shift lever was moved in shifting gears, both of which may be calculated by the controller. The memory may also be operable to allow the controller 22 to read any or all of the shift histories 28, particularly when the operator of the vehicle shifts the manual transmission from one gear ratio to another.

Further, the shift histories 28 may be additionally processed by the controller 22 to produce a unique look-up table (hereinafter "LUT") which may be used by the controller to send the proper clutch and shift fork actuator signals to the clutch actuator and shift fork actuator, respectively, based on the inputs received from various sensors and/or systems. The LUT may be indexed according to any of the stored parameters. For example, in one embodiment, the LUT may be indexed according to the present gear selected. For the present gear selected, the LUT may contain a plurality of shift histories including the gear which the transmission was shifted into for each shift history. The memory 24 may comprise static random access memory (SRAM), flash memory, or any other type of memory which accomplishes the same result.

In one embodiment, the controller 22 may be operable to send the appropriate clutch command signal to the clutch actuator, based on the various signals received from the gear selection sensor and the clutch pedal sensor. As an illustrative example, the clutch command signal may be based on the clutch pedal position sensor such that the clutch actuator mirrors the position of the clutch pedal. When the clutch pedal is depressed, as determined by the clutch pedal position sensor, the controller may send a clutch command signal to the clutch actuator to actually disengage the engine from the transmission. The shift fork actuator signal may be based on the gear selection sensor. When the shift lever is actually moved, as determined by the gear selection sensor, the controller may send a shift fork command signal to the shift fork actuator which shifts the transmission to the selected gear ratio. Many other types of variations are contemplated with this setup.

In another embodiment, the controller 22 may include an AI algorithm 70 which is operable to learn a driving style of the operator of the vehicle. In this embodiment, the controller 22 may be operable to receive additional vehicle operation input signals in addition to the gear selection signal, the tactile signal, the clutch position signal and the clutch pressure signal. The vehicle operation input signals may include signals indicating the rotational speed of the engine, the load of the engine, the speed of the vehicle, the position of the brake pedal, and the position of the throttle. It may learn the driving style of the operator by storing the state of some or all of the input signals when the operator shifts gears. As an illustrative example, the AI algorithm 70 may record the rotational speed, the engine load, the vehicle speed, the brake pedal position, and the throttle position at the moment the transmission is shifted from 1st gear to 2nd gear. Continuing with this example, at the moment of the gear shift, the rotational speed (of the engine) may be 3000 revolutions per minute ("RPM"), the vehicle speed may be 15 miles per hour ("MPH"), the engine load may be 80% and the brake pedal position may be completely released. This information may be captured in a memory of the controller when the transmission is shifted from, for example, 1st gear to 2nd gear. The captured and stored information may be described as a "shift history" 28 as described herein. Subsequent gear shifts may result in additional shift histories 28 being stored in the memory 24. This information may then be used to build a LUT indexed according to the present gear selection. In this fashion, the controller 22 learns the driving style of the operator and may use such information to predict or anticipate future gear shifts based on present state of the inputs to the controller relative to those stored in the LUT.

In yet another embodiment, some or all of the input signals may be wireless. That is, they may be communicated to the controller 22 without using wires. As an example, a radio frequency or inductive scheme may be used to communicate some or all of these signals to the controller 22.

Figure 5A:
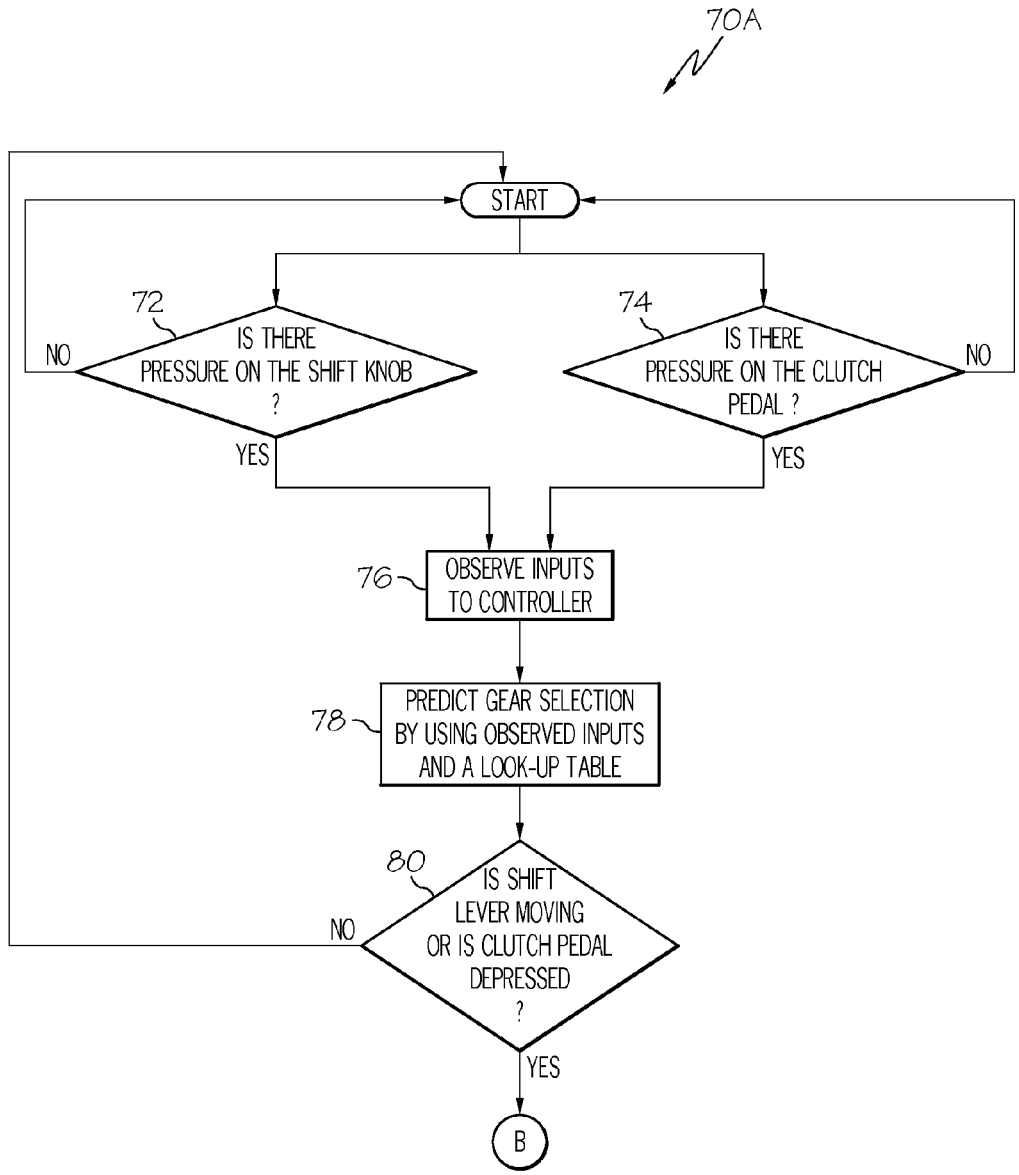
FIGS. 5A-5B depicts flowcharts of a method used to control a manual transmission according to one or more embodiments shown and described herein.
Figure 5B:
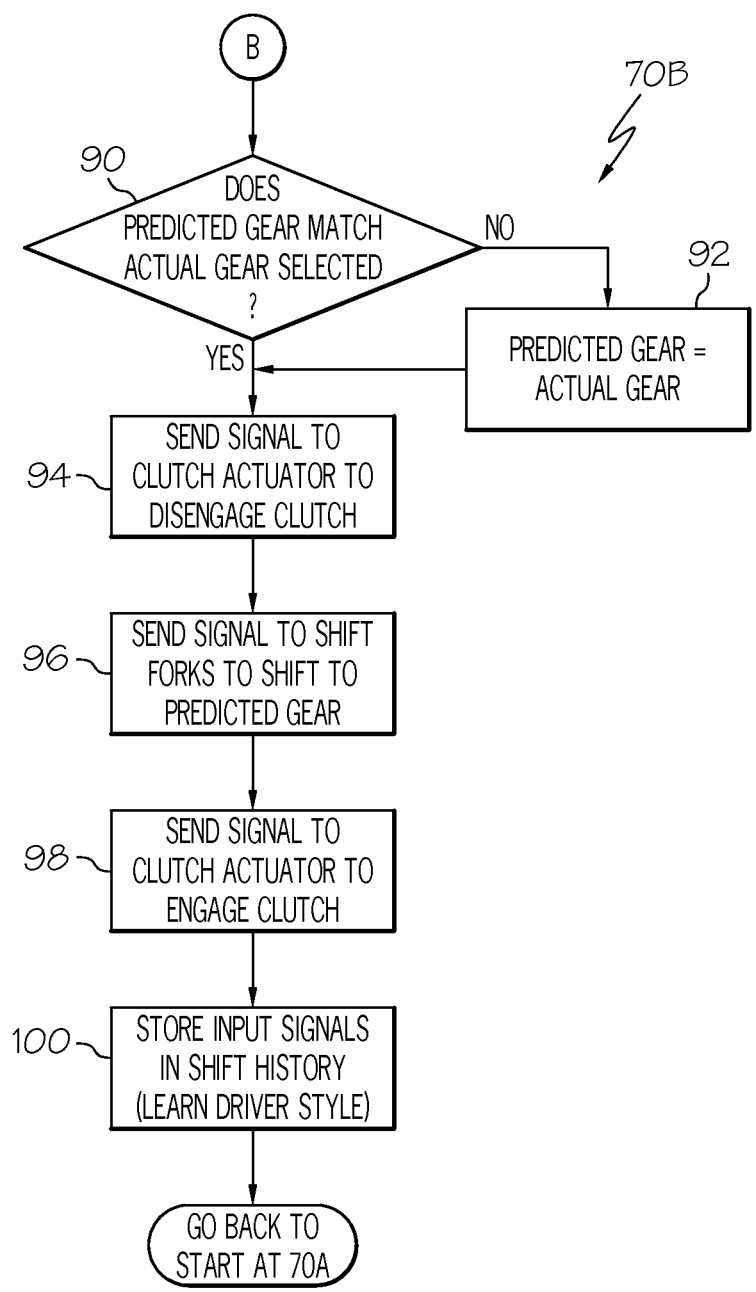

Referring now to FIGS. 5A and 5B, in one embodiment, the artificial intelligence ("AI") algorithm stored in a memory of the controller may be operable to predict which gear ratio 20 the operator will select based on prior shift histories 28 stored and/or indexed in the LUT. The AI algorithm may be divided into two portions: a decision portion 70A illustrated in FIG. 5A and an actuation portion 70B illustrated in FIG. 5B. In the decision portion 70A, the AI algorithm may simultaneously determine the state of the shifter tactile sensor at step 72 and the clutch pedal pressure sensor at step 74. If the operator has applied pressure to either the shift lever (as determined from the shifter tactile sensor) or the clutch pedal (as determined from the clutch pedal pressure sensor) thus indicating that the driver is preparing to shift, then the AI algorithm may proceed to step 76.

An alternative embodiment of the decision portion 170A of the artificial intelligence algorithm is shown in 6. In this embodiment the system for electronically shifting a manual transmission does not comprise a clutch or does not comprise a clutch pedal with a clutch pedal pressure sensor, and the AI algorithm may only determine if an operator of the vehicle has applied pressure to the shift knob of the shift lever (as determined from the shifter tactile sensor).

Figure 6:
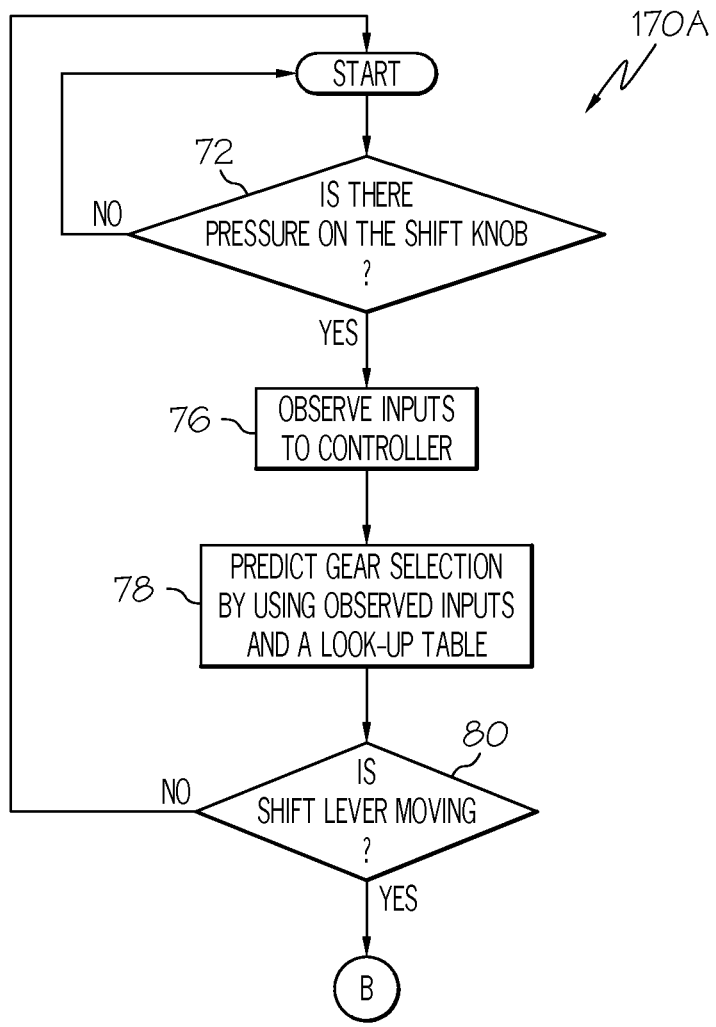
FIG. 6 depicts a flowchart of another method used to control a manual transmission according to one or more embodiments shown and described herein.

Referring now to both FIGS. 5A and 6, at step 76, the AI algorithm may determine the state of other sensor inputs coupled to the controller such as, for example, the gear selection sensor, the clutch pedal position sensor, the engine rotational speed, the engine load, the vehicle speed, the brake pedal position, and the throttle position. Other inputs which are available to the controller 22 may also be determined, including, but not limited to, an input representing the angle of the steering system. Furthermore, the AI algorithm may also determine the present gear ratio selected, e.g., the gear ratio selected when pressure was applied to the shifter tactile sensor.

After determining the sensor inputs at step 76, the AI algorithm continues to step 78 where it predicts the gear ratio that will be selected. In one embodiment, the AI algorithm does this by comparing the present state of the inputs with one or more shift histories 28. As previously discussed, a shift history 28 may represent the state of the inputs when the operator shifted from one specific gear to another specific gear. When the present state of the inputs, including the presently selected gear, corresponds to the stored inputs in a shift history, the AI algorithm may determine a predicted gear shift based on the gear shift information stored in the corresponding shift history.

Because there is a plurality of gear ratios, there may also be a plurality of shift histories, one for shifts from 1st gear to 2nd gear, etc. Accordingly, in another embodiment, the controller 22 may utilize an LUT of shift histories for a specific driver. The LUT, in essence, may be a combination of shift histories that have been compiled over time. If an LUT has been created, the AI algorithm may compare the state of the inputs with the LUT in order to predict the gear ratio that will be selected by the operator. The controller 22 may create an LUT or a group of shift histories 28 for a specific driver. Furthermore, if the vehicle is new or does not have any shift histories, the AI algorithm may utilize a "default" shift history or LUT while it learns the driving style of the operator. It is contemplated that there may be multiple LUT's or groups of shift histories, one for each operator of the vehicle. The AI algorithm may be operable to detect which operator is driving the vehicle based on the present inputs and the stored LUT's or shift histories.

Referring now to FIG. 5A, after the predicted gear selection is determined, the AI algorithm next proceeds to step 80. In step 80 the controller determines if the shift lever is moving based on the gear selection signal from the shifter assembly or if the clutch pedal is depressed based on the clutch pedal position signal. If the shift lever is not moving and the clutch pedal is not depressed, then the algorithm loops back to the start. If the shift lever is moving and/or the clutch pedal is depressed, the algorithm proceeds to the actuation portion 70B of the AI algorithm which is shown in FIG. 5B. Accordingly, it will be understood that, if either the shift lever is moving or the clutch pedal is depressed, the AI algorithm proceeds to the actuation portion 70B. However, if the shift lever is not moving and the clutch pedal is not depressed, the algorithm returns to the start and is repeated.

Referring to an alternative embodiment of the decision portion 170A of the AI algorithm shown in FIG. 6, where the system for electronically shifting a manual transmission does not comprise a clutch or does not comprise a clutch pedal the AI algorithm, after the predicted gear selection is determined, the AI algorithm proceeds to step 80 where it is determined if the shift lever is moving based on the gear selection signal from the shifter assembly. If the shift lever is not moving, then the algorithm loops back to the start and repeats. If the shift lever is moving, the algorithm proceeds to the actuation portion 70B of the AI algorithm, as depicted in FIG. 5B.

Referring now to the actuation portion 70B of the artificial intelligence algorithm shown in FIG. 5B, at step 90, the algorithm determines whether the predicted gear matches the actual gear selected. It may do this by observing the state of the gear selection sensor and determining whether the operator is moving the shift lever to the predicted gear. If the operator's actions indicate that the operator selected gear is the same as the predicted gear, then the algorithm proceeds to step 94. However, if the operator selects a gear that is different than the predicted gear, then the algorithm proceeds to step 92 where the predicted gear is set to the same value as the actual gear selected by the operator as determined by the gear selection sensor signal. The algorithm then proceeds to step 94, where the algorithm sends a clutch command signal to the clutch actuator to disengage the clutch. The algorithm next proceeds to step 96, and sends a shift fork command signal to the one or more shift fork actuators in order to shift the manual transmission into the predicted gear ratio.

The AI algorithm then proceeds to step 98, where the controller sends a clutch command signal to the clutch actuator to engage the clutch. At step 100, the AI algorithm may store the state of the input signals at the time of the shift to a shift history in memory. Finally, the algorithm proceeds back to start at the decision portion 70A.

It should be understood that the order of the steps in FIGS. 5A-5B and 6 is exemplary, and that some of the steps may be performed in a different order. Also, it is contemplated that other embodiments may add additional steps or modifies the function of existing steps.

Referring to FIGS. 5A-5B, in an illustrative example of the AI algorithm, the transmission of the vehicle may be in 2nd gear and traveling at 25 MPH with an engine rotational speed of 3000 RPM. At steps 72 and 74, the algorithm determines if the operator has applied pressure to either the shift lever or the clutch pedal by monitoring the outputs of the gear selection sensor and the clutch pedal pressure sensor. When the operator contacts either the clutch pedal or the shifter, the algorithm proceeds to step 76. At step 76, the algorithm observes the state of some or all of the inputs to the controller as well as the present gear ratio selected in order to predict or anticipate which gear the driver may shift the transmission into. In this example, the vehicle is presently in 2nd gear, the vehicle speed is 25 MPH, the engine rotational speed is 3000 RPM, the engine load is 75%, the operator is not applying pressure to the brake, and the engine throttle is at 35%. Based on these inputs, the AI algorithm predicts at step 78 that the operator will shift to 3rd gear (an upshift) using a previously established shift history and/or LUT of shift histories. At step 80 the algorithm determines whether the shift lever is moving based on the gear selection signal from the shift lever position sensor and if the clutch pedal is depressed based on the clutch pedal position signal from the clutch pedal position sensor. If the shift lever is not moving and the clutch pedal is not depressed, the algorithm returns to the start and is repeated. When the shift lever is moved or moving and/or the clutch pedal is depressed, the algorithm proceeds to step 90 of the actuation portion 70B of the AI algorithm.

At step 90, the AI algorithm determines whether the operator has actually selected 3rd gear by observing the movement of the shift lever position sensor. In this example the direction of movement of the shift lever corresponds to the operator shifting to 3rd gear and the AI algorithm proceeds to step 94, where the controller sends the appropriate command signal to the clutch actuator to disengage the clutch. At step 96, the AI algorithm shifts the transmission to the predicted gear (as determined in step 78) by sending the appropriate command signal to the shift fork actuator thereby actuating the shift fork actuator. At step 98, the AI algorithm sends the appropriate command signal to the clutch to re-engage the clutch. Finally, at step 100, the controller stores the information regarding this particular shift in a shift history in memory. In this example, the shift history will indicate that the operator shifted from 2nd gear to 3rd gear, during which time the vehicle was traveling at 25 MPH, the engine rotational speed was 3000 RPM, the engine load was 75%, the engine throttle was 35%, and so forth.

Figure 7:
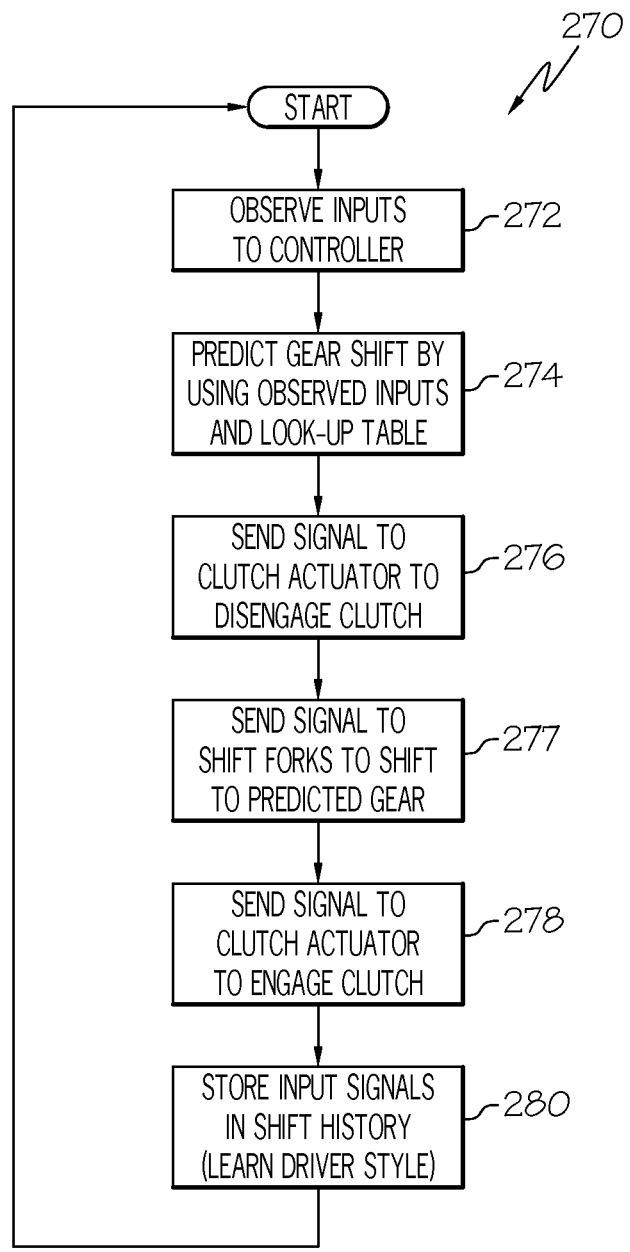
FIG. 7 depicts a flowchart of another method used to control a manual transmission according to one or more embodiments shown and described herein.

Referring now to FIG. 7, in another embodiment, the vehicle may comprise an electronically actuated manual transmission and clutch, as described hereinabove and shown in FIG. 1. However, in this embodiment, the manual transmission does not comprise a shifter assembly or a clutch pedal. Instead, the manual transmission is shifted by the controller 22 utilizing various inputs from the engine, brake pedal, steering system, etc., in addition to shift histories stored in memory. For example, referring to the AI algorithm 270 shown in FIG. 7, the AI algorithm may, at step 272, determine the state of sensor inputs coupled to the controller such as, for example, the engine rotational speed, the engine load, the vehicle speed, the brake pedal position, and the throttle position. Other inputs which are available to the controller 22 may also be determined, including, but not limited to, an input representing the angle of the steering system.

After determining the sensor inputs at step 272, the AI algorithm continues to step 274 where it predicts the next gear ratio based on the observed inputs determined in step 272. In one embodiment, the AI algorithm does this by comparing the present state of the inputs with one or more shift histories 28. As previously discussed, a shift history 28 may represent the state of the inputs when the transmission was previously shifted from one specific gear to another specific gear. When the present state of the inputs, including the presently selected gear, corresponds to the stored inputs in a shift history, the AI algorithm may determine a predicted gear shift based on the gear shift information stored in the corresponding shift history.

The algorithm then proceeds to step 276, where the algorithm sends a clutch command signal to the clutch actuator to disengage the clutch. The algorithm next proceeds to step 277, and sends a shift fork command signal to the one or more shift fork actuators in order to shift the manual transmission into the predicted gear ratio.

The AI algorithm then proceeds to step 278, where the controller sends a clutch command signal to the clutch actuator to engage the clutch. At step 280, the AI algorithm may store the state of the input signals at the time of the shift to a shift history in memory. Finally, the algorithm proceeds back to start.

In the situation where more than one driver will operate the same vehicle, the AI algorithms described herein may be operable to determine which person is operating the vehicle by observing the present driving style and comparing it with shift histories 28 stored in the memory of the controller. In this embodiment, the AI algorithm may store a set of shift histories 28 for each operator of the vehicle. When the vehicle is first started, the AI algorithm may initially monitor the driving style of the operator based on the driver's shifts in relation to the vehicle operating parameters and determine which of the possible operators is driving the vehicle. In an alternative embodiment, the AI algorithm may use the driving style of the previous operator of the vehicle, at least initially, until it determines that a different driver is operating the vehicle. In another embodiment, the AI algorithm may use a baseline or default shift history upon vehicle start up until the driving style of the operator is identified. In yet another embodiment, the AI algorithm may be directly informed of which driver is operating the vehicle by an identification mechanism. For example, the operator may be able to input an identity into the system or specifically select a preconfigured driving style.

In yet another embodiment, the controller may select a specific gear ratio when the vehicle is parked, and the operator has not selected a gear ratio (i.e., leaves the shift lever in the "neutral" position). For example, the controller my select the reverse gear ratio if the operator parks the vehicle and leaves the shift lever in the neutral position. This may prevent the vehicle from moving in the event that the operator fails to properly apply the parking brake.

It should now be understood that the systems and components described herein may be used to control a manual transmission and, more specifically, to electronically shift a manual transmission using an actuated clutch and an actuated shift fork. Moreover, utilizing the instrumented control pedals and instrumented shifter assembly described herein, a control algorithm may be used to anticipate an operator initiated gear shift and thereby reduce the reaction time of the clutch actuator in disengaging the clutch of the vehicle and the shift fork actuator(s) in moving the shift forks of the vehicle such that the automatic or actuated shifts have the feel of actual driver controlled and actuated shifts thus preserving the driving experience and feel of the manual transmission.

While particular embodiments and aspects of the present invention have been illustrated and described herein, various other changes and modifications may be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A method for controlling a manual transmission of a vehicle, the method comprising:
   providing a manual transmission comprising a shift fork actuator and a shifter assembly comprising a shift lever, a shift knob disposed on the shift lever, a shift lever position sensor and a shifter tactile sensor;
   determining when pressure is applied to the shift knob of the shifter assembly with the shifter tactile sensor;
   monitoring vehicle operating parameters when pressure is applied to the shift knob;
   determining a predicted gear selection based on the monitored vehicle operating parameters;
   determining an operator gear selection using the shift lever position sensor when the shift lever is moved;
   comparing the predicted gear selection to the operator gear selection; and
   shifting the manual transmission to the predicted gear selection automatically with the shift fork actuator when the predicted gear selection is the same as the operator gear selection.

2. The method of claim 1 further comprising shifting the manual transmission to the operator gear selection with the shift fork actuator when the predicted gear selection is not the same as the operator gear selection.

3. The method of claim 1 further comprising:
   providing a clutch pedal with a pedal portion;
   determining when pressure is applied to the pedal portion of the clutch pedal without the clutch pedal being depressed simultaneous with determining if pressure is applied to the shift knob of the shifter assembly.

4. The method of claim 3 wherein the vehicle operating parameters are monitored when pressure is applied to either the shift knob, the pedal portion of the clutch pedal, or both.

5. The method of claim 1 further comprising:
   providing a clutch pedal with a clutch pedal position sensor; and determining if the clutch pedal is depressed using the clutch pedal position sensor.

6. The method of claim 5 wherein the operator gear selection is determined when the shift lever is moved and the clutch pedal is depressed.

7. The method of claim 1 wherein the predicted gear selection is determined by comparing a presently selected gear and the monitored vehicle operating parameters to a look-up table comprising vehicle operating parameters and previous gear selections indexed according to the presently selected gear.

8. A system for electronically shifting a manual transmission of a vehicle, the system comprising a shifter assembly, a shift fork actuator, a clutch actuator, and a controller, wherein:
the shifter assembly comprises a shift lever comprising a shift knob, a shift gate, a shifter tactile sensor, and a shift lever position sensor, wherein:
the shifter tactile sensor is operable to detect a pressure applied to the shift knob and send a tactile signal to the controller indicative of the pressure being applied to the shift knob; and
the shift lever position sensor is operable to detect a position of the shift lever in the shift gate and send a gear selection signal to the controller indicative of the selected gear ratio;
the controller is operable to:
receive at least one vehicle operation input signal;
determine a predicted gear selection based on the received vehicle operation input signal;
determine a shift command signal based on the received gear selection signal when the received tactile signal indicates pressure is applied to the shift knob, wherein the gear selection signal is indicative of an operator gear selection;
compare the predicted gear selection to the operator gear selection;
send a clutch command signal to the clutch actuator; and
send the shift command signal to the shift actuator when the predicted gear selection is the same as the operator gear selection and the gear selection signal indicates that the shift lever has moved;
the clutch actuator is operable to receive the clutch command signal from the controller and, based on the received clutch command actuate the clutch; and
the shift fork actuator is operable to receive the shift command signal from the controller and automatically shift the manual transmission to the gear ratio represented by the shift command signal when the predicted gear selection is the same as the operator gear selection.

9. The system of claim 8 further comprising a clutch pedal comprising a clutch pedal pressure sensor and a clutch pedal position sensor, wherein:
the clutch pedal pressure sensor is operable to detect a pressure applied to the clutch pedal and send a clutch pedal pressure signal to the controller indicative of pressure being applied to the clutch pedal, wherein the shift command signal is determined by the controller when the received tactile signal indicates pressure is applied to the shift knob, when the received clutch pedal pressure signal indicates pressure is applied to the clutch pedal, or both;
the clutch pedal position sensor is operable to detect a position of the clutch pedal and send a clutch pedal position signal to the controller indicative of the position of the clutch pedal; and
the clutch command signal is determined by the controller based on the received clutch pedal position signal.

10. The system of claim 8 wherein the controller is further operable to send a shift command signal to the shift fork actuator to shift the manual transmission to the operator gear selection when the predicted gear selection is not the same as the operator gear selection.

11. The system of claim 8 wherein the predicted gear selection is determined by comparing a presently selected gear and the vehicle operation input signals to an LUT of prior vehicle operation input signals indexed according to the presently selected gear.

12. The system of claim 8 further comprising storing the predicted gear selection and the vehicle operation input signals in a look-up table indexed according to the presently selected gear.

13. The system of claim 8 wherein the vehicle operation input signal comprises a speed at which the shift lever is moved, a rotational speed signal indicative of the rotational speed of an engine of the vehicle, an engine load signal indicative of the load on the engine, a vehicle speed signal indicative of a speed of the vehicle, a brake pedal position signal indicative of a position of a brake pedal, a throttle position signal indicative of a position of a throttle, a steering wheel position signal or combinations thereof.

14. The system of claim 8 wherein the controller is further operable to place the transmission in a predetermined gear ratio when the vehicle is parked and the operator does not select a gear ratio.

15. A method for controlling a manual transmission of a vehicle, the method comprising:
providing a manual transmission comprising a shift fork actuator and a clutch actuator and a controller operable to actuate the shift fork actuator and the clutch actuator and receive at least one vehicle operation input signal;
learning a driving style of an operator of the vehicle by storing a plurality of shift histories in a memory associated with the controller, the shift histories comprising the value of the at least one vehicle operation input signal for a shift;
determining a predicted gear selection based on at least one current vehicle operation input signal, a presently selected gear ratio and the stored shift histories; and
actuating, automatically, the shift fork actuator and the clutch actuator to shift the manual transmission to the predicted gear selection.

16. The method of claim 15 further comprising:
determining an operator gear selection;
comparing the operator gear selection with the predicted gear selection; and
actuating the shift fork actuator and the clutch actuator to shift the manual transmission to the predicted gear selection when the predicted gear selection is the same as the operator gear selection.

17. The method of claim 15 further comprising:
providing a shifter assembly comprising a shift lever and shift knob with a shifter tactile sensor, wherein the shifter tactile sensor is operatively coupled to the controller and the predicted gear selection is determined when pressure is applied to the shift knob as determined with the shifter tactile sensor.

18. The method of claim 17 further comprising:
providing a clutch pedal comprising a pedal portion with a clutch pedal pressure sensor, wherein the clutch pedal pressure sensor is operatively coupled to the controller and the predicted gear selection is determined when pressure is applied to the pedal portion as determined by the clutch pedal pressure sensor, when pressure is applied to the shift knob, or both.

19. The method of claim 18 further comprising actuating the shift fork actuator and the clutch actuator to shift the manual transmission to the operator gear selection when the predicted gear selection is not the same as an operator gear selection.

20. The method of claim 1, wherein the shifter tactile sensor comprises a matrix of sensors positioned over the shift knob.

21. The method of claim 1, wherein the predicted gear selection is determined by comparing the monitored vehicle operating parameters to at least one shift history.

* * * * *